(12) United States Patent
Appleton et al.

(10) Patent No.: US 8,219,598 B1
(45) Date of Patent: Jul. 10, 2012

(54) CROSS-DOMAIN COMMUNICATING USING DATA FILES

(75) Inventors: Benjamin Charles Appleton, Summer Hill (AU); Joseph O. Neeman, Berkeley, CA (US); Dmitri Abramov, Liberty Grove (AU); Michael Greystock Jones, Lane Cove North (AU)

(73) Assignee: Google Inc., Mountain View, CA (US)

( * ) Notice: Subject to any disclaimer, the term of this patent is extended or adjusted under 35 U.S.C. 154(b) by 414 days.

(21) Appl. No.: 12/463,816

(22) Filed: May 11, 2009

(51) Int. Cl.
*G06F 17/30* (2006.01)
*G06F 15/16* (2006.01)

(52) U.S. Cl. .................. 707/824; 707/705; 709/217

(58) Field of Classification Search ............... 707/999.1, 707/824, 705; 709/217
See application file for complete search history.

(56) References Cited

U.S. PATENT DOCUMENTS

| | | | | |
|---|---|---|---|---|
| 5,751,956 A * | 5/1998 | Kirsch | ........................... | 709/203 |
| 6,119,171 A * | 9/2000 | Alkhatib | ........................... | 709/245 |
| 6,785,688 B2 * | 8/2004 | Abajian et al. | ........................... | 707/700 |
| 6,938,079 B1 * | 8/2005 | Anderson et al. | ........................... | 709/222 |
| 7,287,256 B1 * | 10/2007 | Lozben et al. | ........................... | 719/316 |
| 2003/0046385 A1 * | 3/2003 | Vincent | ........................... | 709/224 |
| 2003/0071851 A1 * | 4/2003 | Unger et al. | ........................... | 345/781 |
| 2003/0120727 A1 * | 6/2003 | Mentchoukov | ........................... | 709/203 |
| 2004/0249801 A1 * | 12/2004 | Kapur | ........................... | 707/3 |
| 2006/0059416 A1 * | 3/2006 | Lin | ........................... | 715/501.1 |
| 2006/0075120 A1 * | 4/2006 | Smit | ........................... | 709/227 |
| 2006/0218036 A1 * | 9/2006 | King et al. | ........................... | 705/14 |
| 2007/0143345 A1 * | 6/2007 | Jones et al. | ........................... | 707/104.1 |
| 2007/0169010 A1 * | 7/2007 | Garner et al. | ........................... | 717/136 |
| 2007/0214240 A1 * | 9/2007 | Kalliola et al. | ........................... | 709/219 |
| 2007/0294333 A1 * | 12/2007 | Yang et al. | ........................... | 709/203 |
| 2008/0010344 A1 * | 1/2008 | Wherry et al. | ........................... | 709/204 |
| 2008/0016245 A1 * | 1/2008 | Cunningham et al. | ........................... | 709/246 |
| 2008/0098296 A1 * | 4/2008 | Brichford et al. | ........................... | 715/234 |
| 2008/0126484 A1 * | 5/2008 | Wherry et al. | ........................... | 709/204 |
| 2008/0281944 A1 * | 11/2008 | Vorne et al. | ........................... | 709/218 |
| 2008/0301460 A1 * | 12/2008 | Miller et al. | ........................... | 713/183 |
| 2009/0030996 A1 * | 1/2009 | Saito et al. | ........................... | 709/206 |
| 2009/0164564 A1 * | 6/2009 | Willis | ........................... | 709/203 |
| 2009/0216683 A1 * | 8/2009 | Gutierrez | ........................... | 705/80 |
| 2009/0228572 A1 * | 9/2009 | Wall et al. | ........................... | 709/218 |
| 2009/0319672 A1 * | 12/2009 | Reisman | ........................... | 709/227 |

(Continued)

OTHER PUBLICATIONS

Hastings, Richard, "XML and Flash Integration: Applied", Thesis—ECTE 457, EDTLab, Univ. of Wollongong, Wollongong, NSW Australia, Oct. 2001, 60 pages.*

(Continued)

*Primary Examiner* — Robert Stevens
(74) *Attorney, Agent, or Firm* — Fish & Richardson P.C.

(57) ABSTRACT

In one implementation, a computer-implemented method includes receiving at a data server computer hosted at a first internet domain a request from a client computer for data to be used by an application SWF file received from a web server hosted at a second internet domain and executed by the client computer, the request includes the second internet domain and information specifying the requested data. The method further includes generating at least a portion of a data SWF file including the requested data and a domain identifier corresponding to the second internet domain, the domain identifier configured to specify that SWF formatted files associated with the second internet domain are permitted to access the requested data within the data SWF file. The method also includes transmitting the data SWF file from the data server computer to the client computer.

20 Claims, 6 Drawing Sheets

U.S. PATENT DOCUMENTS

| | | | |
|---|---|---|---|
| 2010/0030870 A1* | 2/2010 | Davis et al. | 709/219 |
| 2010/0095208 A1* | 4/2010 | White et al. | 715/704 |
| 2010/0146523 A1* | 6/2010 | Brigaut et al. | 719/330 |
| 2010/0180284 A1* | 7/2010 | Ross | 719/330 |
| 2010/0223467 A1* | 9/2010 | Dismore et al. | 713/168 |
| 2010/0250653 A1* | 9/2010 | Hudgeons et al. | 709/203 |
| 2010/0281107 A1* | 11/2010 | Fallows et al. | 709/203 |

OTHER PUBLICATIONS

Tibermacine, Chouki, et al., "Enforcing Architecture and Deployment Constraints of Distributed Component-Based Software", FASE 2007, LNCS 4422, Springer-Verlag Berlin, Germany, © 2007, pp. 140-154.*

Baror, Yuval, et al., "Flash parameter injection: A Security Advisory", IBM Rational Application Security Team whitepaper, IBM Corporation, © 2008, 16 pages.*

Blom, Sören, et al., "Write Once, Run Anywhere—A Survey of Mobile Runtime Environments", GPC Workshops '08, Kunming, China, May 25-28, 2008, pp. 132-137.*

Hendrickx, Michael, et al., "XSS: Cross site scripting, detection and prevention", Scanit whitepaper, Dubai Internet City, United Arab Emirates, © 2003, 9 pages.*

Richard, Jean-Baptiste, et al., "SIGNe: A Geographic Information System on the Web for End-Stage Renal Disease", ENMI 2005, Connecting Medical Informatics and Bio-Informatics, Section 9: Terminologies, Ontologies, Standards and Knowledge Engineering, © 2005, pp. 713-718.*

Clausen, Martin, "Testing Flash Applications using WebScarab", Deloitte, © 2008, 11 pages.*

Di Paola, Stefano, "Testing Flash Applications", 6th OWASP AppSec Conference, Milan, Italy, May 2007, 77 pages.*

"Policy File Changes in Flash Player 9 and Flash Player 10" http://www.adobe.com/devnet/flashplayer/articles/fplayer9_security.html, 2009 7 pages.

"Cross-domain policy file usage recommendations for Flash Player" (created Mar. 12, 2007) [online] http://www.adobe.com/devnet/flashplayer/articles/cross_domain_policy.html, 7 pgs.

"Cross-domain policy file specification" http://www.adobe.com/devnet/articles/crossdomain_policy_file_spec.html, (c) 2009, 18 pgs.

* cited by examiner

CROSS-DOMAIN COMMUNICATING USING DATA FILES

TECHNICAL FIELD

This document generally describes method and systems for generating a data file to enable cross-domain data services within an application having cross-domain restrictions.

BACKGROUND

The Internet is a means by which data is exchanged between clients and servers throughout the world. A variety of electronic file formats can be used exchange data. Additionally, a variety of client applications can be used to execute and display the various electronic file formats. For example, ADOBE's FLASH PLAYER application ("FLASH application") executes and displays SHOCKWAVE FLASH files ("FLASH files").

Generally, the FLASH application running on a client does not permit data contained within a FLASH file from a first domain (e.g., www.first-domain.com) to be accessed by a FLASH file from a second domain (e.g., www.second-domain.com). This security restriction may be referred to as creating a "domain boundary" that prohibits the sharing of data between FLASH files from different domains. Such sharing of data across a domain boundary can be termed as a "cross-domain data service."

A crossdomain.xml policy file permits cross-domain data services for FLASH files from different domains being executed by a FLASH application. The crossdomain.xml policy file indicates to a FLASH application on a client (separate from the first and second domains) that FLASH files from a second domain have permission to cross the domain boundary and access data contained within the first domain's FLASH files.

SUMMARY

This document describes techniques for generating a data file so as to enable cross-domain data services within an application having cross-domain restrictions. In general, a data server hosted at a first internet domain can receive a request from a client for a data file capable of providing cross-domain data services to an application file from a second internet domain that is being executed by the client. The data server can dynamically generate the data file to contain, at least, the second internet domain of the application file. The data server can send the dynamically generated data file to the client to enable cross-domain data services between the data file and the application file.

In one example implementation, the dynamically generated data file and/or the application file can be a vector graphic file, such as a FLASH file.

In one implementation, a computer-implemented method includes receiving at a data server computer hosted at a first internet domain a request from a client computer for data to be used by an application SWF file received from a web server hosted at a second internet domain and executed by the client computer, the request includes the second Internet domain and information specifying the requested data, wherein the application SWF file is a SWF formatted file. The method further includes generating, in response to the received request, at least a portion of a data SWF file including the requested data and a domain identifier corresponding to the second internet domain, wherein the data SWF file is a SWF formatted file, the domain identifier configured to specify that SWF formatted files associated with the second internet domain are permitted to access the requested data within the data SWF file. The method also includes transmitting the data SWF file from the data server computer to the client computer, wherein the data SWF file is adapted to be accessed by the application SWF file to retrieve the requested data associated with the second internet domain.

In another implementation, a system for transmitting a data vector graphic file to a client computer includes one or more servers hosted at a first internet domain and an interface to the one or more servers to receive a request from a client computer for data to be used by an application vector graphic file from a web server executed by the client computer, the web server hosted at a second internet domain, the request includes the second Internet domain and information specifying the requested data. The system further includes a means for generating, in response to the received request, at least a portion of a data vector graphic file including the requested data and a domain identifier corresponding to the second internet domain, the domain identifier specifying that application vector graphic files associated with the second internet domain are permitted to access the requested data contained within the data vector graphic file. The system also includes a communication module to transmit the data vector graphic file from the one or more servers to the client computer, wherein the data vector graphic file is adapted to be accessed by the application vector graphic file to retrieve the requested data associated with the second internet domain.

In another implementation, a computer-implemented method includes compiling by a data server computer hosted at a first Internet domain a template for a vector graphic file having a placeholder for an Internet domain into a data vector graphic file. The method further includes executing by the data server computer the following operations when a request for the data vector graphic file is received from a client computer, wherein the request specifies at least a second Internet domain of a third-party vector graphic file to access the data vector graphic file on the client computer: substituting the second Internet domain of the third-party vector graphic file for the placeholder for the internet domain in the data vector graphic file; and sending to the client computer the data vector graphic file with the second internet domain of the third-party vector graphic file substituted, wherein the client computer authorizes access to the data vector graphic file by the third-party vector graphic file.

Advantageously, the described methods, systems, and products may provide one or more benefits. For example, a data server can control which web server FLASH files have permission to access a data server FLASH file on a per request basis. In another example, efficiency in providing cross-domain data services to a FLASH application can be gained by granting permission to access data with the requested data in a single response.

Additionally, finer control over security authorization to requested data can be gained through the described methods, systems, and products. Such finer controlled security authorizations may permit third-parties to receive only certain data and/or to access only certain services. Furthermore, instead of allowing an entire internet domain to receive data and/or services, the described methods, systems, and products can restrict access to specific FLASH applications and/or files associated with an internet domain.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
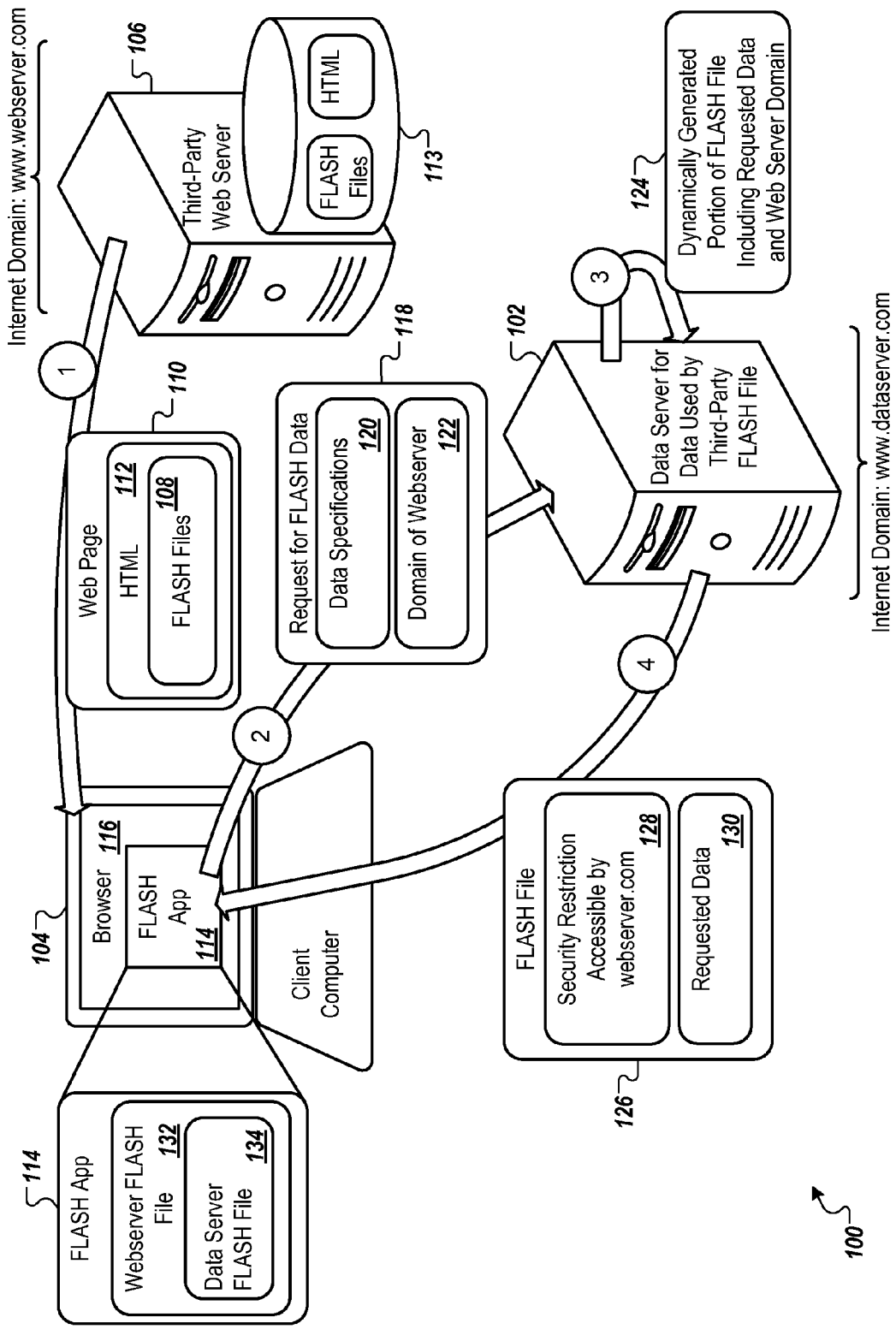
FIG. 1 is a diagram of an example system for providing cross-domain data services to a FLASH application.

This document generally describes methods, systems, and products for enabling cross-domain data services between a data file from a first internet domain and an application file from a second, different, internet domain being executed on a client. The cross-domain data services can be enabled by dynamically generating a data file to include the second internet domain (the internet domain of the application file) and sending the data file to the client.

In one example implementation, the data file and/or the application file can be vector graphic files, such as a FLASH file. The description below describes methods, systems, and products in the context of vector graphic files and, more specifically, FLASH files. For instance, this document describes methods, systems, and products for providing cross-domain data services to a FLASH application without using a crossdomain.xml policy (described above in the Background). More specifically, this document describes methods, systems, and products for generating a FLASH file that enables cross-domain data services between FLASH files from different internet domains.

In the description below, FLASH files may also be referred to as SWF (short for "SHOCKWAVE FLASH") files. Additionally, scripting language files that can be used to create vector graphic files may be referenced (such scripting language files may be compiled into vector graphic files). An example scripting language file used to generate a FLASH file can be referred to as an ACTIONSCRIPT. FLASH files, SWF files, and ACTIONSCRIPT files can be formatted in a variety of ways, for example, as provided in the "SWF File Format Specification Version 10," published by ADOBE Systems Inc., 345 Park Avenue, San Jose, Calif. 95110-2704.

A FLASH application being executed on a client computer can receive from a FLASH file from a web server ("a web server FLASH file"). The web server FLASH file can request data from a data server. To permit the web server FLASH file to access data from the data server (e.g., to enable cross-domain data services), the data server can generate a FLASH file ("a data server FLASH file") specific to the web server FLASH file's request. The data server FLASH file can be generated to contain the data requested by the web server FLASH file. Additionally, the data server FLASH file can be generated to contain a security restriction permitting the web server FLASH file with access to the requested data.

The security restriction can be a domain identifier embedded within the data server FLASH file. The domain identifier can specify that the Internet domain of the web server FLASH file is permitted to cross the domain boundary and access data contained in the data server FLASH file.

The data server FLASH file can be dynamically generated by the data server in response to a request from the web server FLASH file. In some implementations, dynamic generation can include inserting the domain identifier and the requested data into a pre-compiled FLASH file using placeholders. In some implementations, dynamic generation can include compiling a FLASH file using the domain identifier and the requested data.

FIG. 1 is a diagram of an example system 100 for providing cross-domain data services to a FLASH application. The system 100 can include a data server 102, a client computer 104, and a third-party web server 106.

The client computer 104 can receive a web server FLASH file 108 from the third-party web server 106. For a variety of reasons, the client computer 104 may request data from the data sever 102 for the purpose of executing the web server FLASH file 108 using a FLASH application 114. To enable cross-domain data services for the FLASH application 114 on the client computer 104, the data server 102 can dynamically generate a data server FLASH file 126 for the web server FLASH file 108. The data server FLASH file 126 can contain a security restriction 128 that permits the web server FLASH file 108 to access data 130 contained within the data server FLASH file 126 over a domain boundary in the FLASH application 114.

For example, the client computer 104 may receive a web server FLASH file 108 from the third-party web server 106 that, when executed by the FLASH application 114, is an interactive FLASH map program (e.g., a FLASH program that can show a map for a requested address). However, the web server FLASH file 108 may need an application programming interface ("an API") specific to the interactive FLASH map program for the data server 102 to enable the interactive mapping functionality. This API can be contained within the data server FLASH file 126. As such, the client computer 104 may request the data server FLASH file 126 that contains the API. To enable the interactive map program (the web server FLASH file 108) to access the API (the data server FLASH file 126) across the domain boundary in the FLASH application 114, the data server 102 may embed the internet domain of the third-party web server 106 into the data server FLASH file 126 before sending it to the client computer 104.

The client computer 104 can receive a web server FLASH file 108 from the third-party web server 106. In some implementations, the FLASH file 108 can be received as part of a web page 110. For example, content for the web page 110 may be provided by a hypertext markup language ("HTML") file 112. The HTML file 112 can instruct that the web server FLASH file 108 be displayed as part of the web page 110. The web server FLASH file 108, the HTML file 112, and any other files needed for the web page 110 (e.g., a JavaScript, cascading style sheet file, etc.) can be stored in a data repository 112 on the web server 106.

A web browser 116 on the client computer 104 can receive the web page 110 and its accompanying files (including the web server FLASH file 108). Upon determining that the web server FLASH file 108 is to be displayed as part of the web page 110, the web browser 116 can launch the FLASH application 114 to execute the web server FLASH file 108. While executing or preparing to execute the web server FLASH file 108, the FLASH application 114 can determine that a request 118 should be made to the data server 102 for the data server FLASH file 126. In some implementations, another component within the client computer 104, such as the web browser 116, can determine that the data server FLASH file 126 should be requested from the data server 102.

The request 118 to the data server 102 for the data server FLASH file 126 can contain data specifics 120 and/or a domain of the web server 122 from which the web server FLASH file 108 was received. The data specifics 120 can specify the data being requested and/or provide details regarding the web server FLASH file 108 for which the data server FLASH file 126 is being requested. The data specifics 120 can be used by the data server 102 to determining what data should be included in the data server FLASH file 126. The domain of the web server 122 can specify the internet domain of the third-party web server 106.

For example, the client computer 104 may request a FLASH game hosted on www.webserver.com (the internet domain of third-party web server 106). Upon receiving the FLASH game (web server FLASH file 108) from the third-party web server 106, the FLASH application 114 may determine that data for additional game levels is hosted on the data server 102. To obtain the additional levels, the FLASH application 114 can send a request 118 to the data server 102 for the additional level data. The request 118 may include the internet domain www.webserver.com (the Internet domain of the third-party web server 106) and information regarding the FLASH game (web server FLASH file 108) and/or the additional levels.

Upon receiving the request 118, the data server 102 can check whether the web server FLASH file 108 has permission to receive and/or access the data server FLASH file 126. Checking permissions can be performed on a per request basis. Permissions can be based on the data that is being requested and/or the origin of the request. The origin of the request can include the internet domain of the third-party web server 106, the specific web server FLASH file 108, the internet domain of the client computer 104, or any combination thereof.

For example, a web server FLASH file 108 from a first domain may have permission to access and/or receive a first data server FLASH file 126 but not a second data server FLASH file 126. Conversely, a web server FLASH file 108 from a second domain may have permission to access and/or receive the second data server FLASH file 126 but not the first data server FLASH file 126.

In performing the permission check, the data server 102 may access a database or data table that maintains a record of permissions. To perform the check, the data server 102 can use the data specifics 120 and the domain of the web server 122 received as part of the request 118.

Once the request 118 has been determined to have permission to receive the requested data 120 in the form of the data server FLASH file 126, the data server 120 can dynamically generate 124 at least a portion of the data server FLASH file 126. Dynamic generation can include retrieving, generating, and/or compiling the data identified in the data specifics 120. For example, if the web server FLASH file 108 is an interactive mapping program, the request 118 may provide an address as part of the data specifics 120. The data server 120 can retrieve and/or generate a map for this specified address.

Along with the domain of the web server 122, the dynamically generated data can be inserted into a pre-compiled data server FLASH file 126. The pre-compiled data server FLASH file 126 can have placeholders for the domain of the web server 122 and the dynamically generated data. Inserting can include replacing the placeholders with the appropriate data. For instance, after inserting the domain of the web server 122 and the dynamically generated content, the data server FLASH file 126 contains a security restriction 128 permitting access by the domain of the third-party web server 106 and requested data 130 (the data dynamically generated in response to the data specifics 120).

In some implementations, the entire data server FLASH file 126 may be compiled in response to receiving the request 118. In such implementations, the domain of the web server 122 and the dynamically generated data can be inserted into an ACTIONSCRIPT which is then compiled into the data server FLASH file 126. Placeholders may be located in the ACTIONSCRIPT, identifying appropriate locations for the domain of the web server 122 and the dynamically generated data to be inserted.

In some implementations, data server 102 may search a cache of dynamically generated data server FLASH files to see if any of the files match the parameters (e.g., the data specifics 120 and/or the web server domain 122) of the request 118. If a match is found, the data server 102 may send the cached dynamically generated data server FLASH file to the client 104. For example, if a client A and a client B both receive the same web server FLASH file 108 from the third-party web server 106 and the data server 102 generates the data server FLASH file 126 for client A, the data server 102 may use the data server FLASH file 126 generated for client A (assuming the data server FLASH file 126 is cached after being sent to client A) for client B.

After the data server FLASH file 126 has been generated (or located in a cache), the data server 102 can send the data server FLASH file 126 to the FLASH application 114 on the client computer 104. Once received by the FLASH application 114, the cross-domain data service between the web server FLASH file 108 and the data server FLASH file 126 can begin. The cross-domain data service can be enabled by virtue of the internet domain of the third-party data server 106 being appropriately placed in the data server FLASH file 126.

In some implementations, cross-domain data services may be enabled by special code contained in the web server FLASH file 108 and/or the data server FLASH file 126. Such special code can use the inserted internet domain of the third-party data server 106 and specific functionality within the FLASH application 104 to enable data to be shared across the domain boundary. For example, the ACTIONSCRIPT used to create the web server FLASH file 108 may be derived from a template containing the special code to interface the data server FLASH file 126. In such an example, the data server 102 may have made this template and/or special code available to the third-party web server 106.

Figure 2:
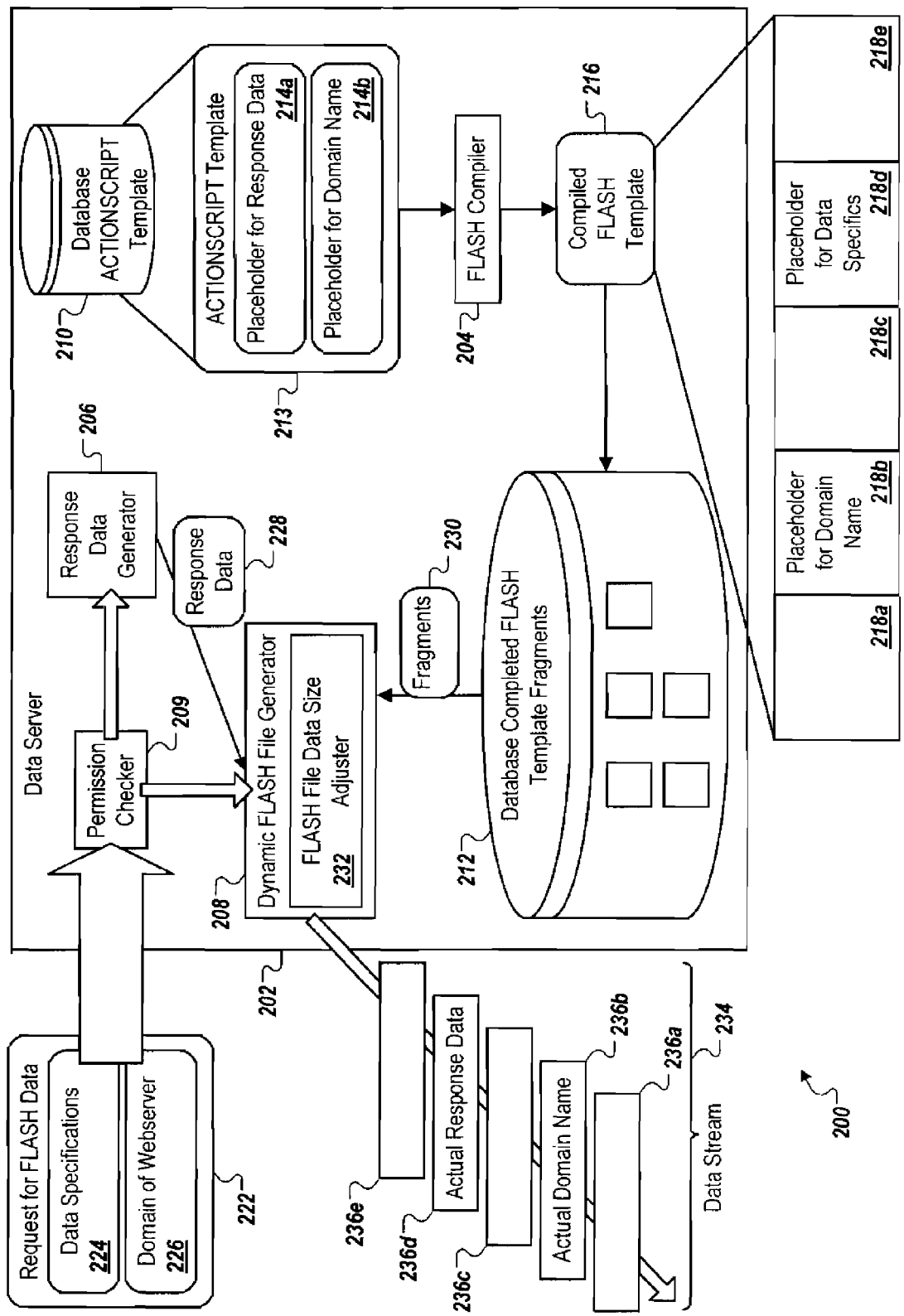
FIG. 2 is a diagram of another example system for providing cross-domain data services to a FLASH application.

FIG. 2 is a diagram of another example system 200 for providing cross-domain data services to a FLASH application. The system 200 can include a data server 202. The system 200 may be similar to the system 100 discussed above with regard to FIG. 1. For example, the data server 202 may be similar to the data server 102.

The data server 202 can include a FLASH compiler 204, a response data generator 206, a dynamic FLASH file generator 208, a permission checker 209, an ACTIONSCRIPT template data repository 210, and/or a compiled FLASH template data repository 212. The data server 202 and at least some its subcomponents (the FLASH compiler 204, the response data generator 206, the dynamic FLASH file generator 208, the permission checker 209, the ACTIONSCRIPT template data repository 210, and/or the compiled FLASH template data repository 212) can be implemented in a variety of computer systems, as described below with reference to FIG. 5.

The FLASH compiler 202 can compile ACTIONSCRIPT templates contained in the ACTIONSCRIPT data repository 210 into FLASH file templates. The compiled FLASH file templates can be stored in the compiled FLASH template data repository 212. Compilation of an ACTIONSCRIPT template and storage of a corresponding compiled FLASH file template can occur some time before a request for the FLASH file template is received (e.g., the ACTIONSCRIPT can be compiled when it is uploaded to the data server 202).

The permission checker 209 can determine whether a received request is permitted to receive and/or access the requested data server FLASH file. If a request is permitted to proceed, the response data generator 206 can generate data specified by a request received by the data server 202. The response generator 206 can provide the generated response data to the dynamic FLASH file generator 208. The dynamic FLASH file generator 208 can combine the received response data with a compiled FLASH file template stored in the compiled FLASH template data repository 212 to create a data server FLASH file. For example, the data server FLASH file 126 from system 100 can be generated using the response data generator 206 and the dynamic FLASH file generator 208.

The FLASH compiler 204 can receive an ACTIONSCRIPT template 213 from the ACTIONSCRIPT template data repository 210. The ACTIONSCRIPT template 213 may contain placeholders 214*a-b*. As part of the ACTIONSCRIPT template 213, the placeholders 214*a-b* can be compiled into a compiled FLASH template 216. The placeholders 214*a-b* can identify locations in the ACTIONSCRIPT template 213 and/or the compiled FLASH template 216 where response data and/or an internet domain for a third-party web server can be inserted.

Placeholder 214*a* can be a placeholder for response data. As described above with regard to system 100, the response data can be generated in response to data specifics contained in a request for a data server FLASH file from a client. The placeholder 214*a* can be a unique set of characters that can permit the placeholder 214*a* to be identified after compilation of the ACTIONSCRIPT template 213.

Placeholder 214*b* can be a placeholder for an internet domain of a web server, such as the internet domain of the third party web server 106. The Internet domain to replace the placeholder can be provided as part of a request for a data server FLASH file. Like the placeholder 214*a*, the placeholder 214*b* can be a unique set of characters.

The FLASH compiler 204 can compile the ACTIONSCRIPT template 213, including the placeholders 214*a-b*, into a compiled FLASH template 216. The FLASH compiler 204 can compile the ACTIONSCRIPT template 213 at a time prior to the data server 202 receiving a request for a data server FLASH file pertaining to the ACTIONSCRIPT template 213. The ACTIONSCRIPT template 213 may be compiled when a new or updated version is received by the data server 202.

The compiled FLASH template 216 can be partitioned into at least five compiled fragments 218*a-e*. The compiled fragments 218*a-e* can be defined by the location of the placeholders 214*a-b* after compilation of the ACTIONSCRIPT template 213 by the FLASH compiler 204.

For instance, fragment 218*a* can refer to a portion of the compiled FLASH template 216 from the start of the file to the placeholder for domain name 214*b*. Fragment 218*b* can refer to the placeholder for domain name 214*b*. Fragment 218*c* can refer to the portion of the compiled FLASH template 216 between the placeholder 214*b* and the placeholder 214*a*. Fragment 218*d* can refer to the placeholder for data specifics 214*a*. Fragment 218*e* can refer to a portion of the compiled FLASH template 216 from the placeholder 214*a* to the end of the file.

The compiled FLASH template 216 can be stored in the compiled FLASH template data repository 212 as fragments 218*a-e*. In some implementations, the data repository 212 may store the fragments 218*a-e* as distinct related files. In other implementations, the data repository 212 may store the compile FLASH template 216 as a single file with information identifying the various fragments 218*a-e*.

Once the compiled FLASH template 216 has been stored in the data repository 212, the data server 202 can be ready to receive and service requests related to the compiled FLASH template 216. Compiling the ACTIONSCRIPT template 213 and fragmenting the compiled FLASH template 216 may be performed a single time. However, the compiled FLASH template 216 and its stored fragments 218*a-e* can be used to service multiple requests.

For example, the ACTIONSCRIPT for an interactive map API can be compiled by the FLASH compiler 204 with placeholders 214*a-b*. The placeholder 214*a* can be for the domain of the third-party web server providing a web server FLASH file that is requesting the API, such as the third-party web server 106 providing the web server FLASH file 108. The placeholder 214*b* can be for map data specific to the request, such as map data for a specific address. Since there are placeholders 214*a-b* for the request specific data that may be part of the API returned in response to a request, the compiled FLASH template 216 for the API can be used to service requests from multiple different clients. Thus, the ACTIONSCRIPT template 213 for the API can be compiled once per multiple requests for the API.

A request for FLASH data 222 can be received by the data server 202. The request for FLASH data 222 may be similar to the request for FLASH data 118 described above with reference to system 100. For instance, the request for FLASH data 222 may be received from a client computer, such as client computer 104, that is executing a web server FLASH file, such as web server FLASH file 108, using a FLASH application, such as FLASH application 114.

The request for FLASH data 222 can contain data specifics 224 and/or a domain of a web server 226 from which a web server FLASH file originated. The data specifics 224 can provide specific information regarding the request. For instance, in the case of an interactive map API being requested, the data specifics 224 can provide a specific address to which the request pertains.

As discussed above with regard to system 100, the data server 202 can check whether the request has permission to receive the requested data before beginning to process the request. The data server 202 can use the permission checker 209 to perform this function. The permission checker 209 can determine whether a request has permission based on the internet domain of the web server 226, an internet domain of the client computer that is executing the web server FLASH file (e.g., an Internet domain for client computer 104 from system 100), the data server FLASH file that is being requested, and/or the data specifics 224 being requested.

Once the permission checker 209 has determined that the request 222 has permission to receive the requested data server FLASH file, the request 222 can be forwarded to the response data generator 206 and the dynamic FLASH file generator 208. The response data generator 206 can use the information from the data specifics 224 to generate response data 228. The response data generator 206 may reference one or more data repositories (not depicted) to generate the response data 228. The response data 228 can be sent to the dynamic FLASH file generator 208 by the response data generator 206.

For instance, in the case a request for an interactive map API and data specifics 224 identifying a specific address for the request, the response data generator 206 can reference a data repository storing map information to generate response data 228 pertaining to the specific address.

Operating in tandem with the response data generator 206, the dynamic FLASH file generator 208 can obtain pre-compiled fragments 230 (e.g., fragments 218a-e) of the requested data server FLASH file from the compiled FLASH template data repository 212. The dynamic FLASH file generator 208 can identify the requested data server FLASH file from request for FLASH data 222. For instance, the request 222 may identify the specific data server FLASH file that (e.g., data server FLASH file containing the interactive map API).

Once the dynamic FLASH file generator 208 has obtained the fragments 230, it can replace the placeholder fragments (e.g., fragments 218b and 218d) with the domain of the web server 226 and the generated response data 228. Before replacing the fragments, the dynamic FLASH file generator 208 may compile the portions to be inserted (the web server 226 and the generated response data 228). The dynamic FLASH file generator 208 can use the FLASH compiler 204 to perform this compilation.

The dynamic FLASH file generator 208 can include a FLASH file data size adjuster 232. The FLASH file data size adjuster 232 can make adjustments to the compiled fragments 230 when the size of the domain of the web server 226 and/or the size of the generated response data 228 is different than the size of the placeholders 218b and 218d, respectively. For instance, the FLASH file data size adjuster 232 may adjust an identifier that provides an overall size for the fragments 230. In another instance, the FLASH file data size adjuster 232 may adjust any internal references that may have changed on account of the placeholders 218b and 218d being replaced.

While the response data generator 206 is generating the response data 228, the dynamic FLASH file generator 208 can begin sending a data stream 234 of the fragments 230 to the client that submitted the request 222. The data stream 234 can consist of streamed data fragments 236a-e. The streamed data fragments 236a, 236c, and 236e can correspond to the data fragments 218a, 218c, and 218e, respectively. The streamed data fragment 236b can correspond to placeholder fragment 218b after it has been replaced with the domain of the web server 226. The streamed data fragment 236d can correspond to the placeholder fragment 218d after it has been replaced with the generated response data 228.

The first streamed data fragment 236a can be sent by the dynamic FLASH file generator 208 while the placeholder fragment 218b is being replaced with the domain of the web server 226 and while the response data generator 206 is generating the response data 228. Similarly, the second streamed data fragment 236b (the placeholder fragment 218b replaced with the domain of the web server 226) and the third streamed data fragment 236c can be streamed to the client while the response data 228 is being generated. The fourth streamed data fragment 236d (the response data 228) and the fifth streamed data fragment 236e can be streamed after the response data 228 has been received from the response data generator 206.

By having precompiled fragments of the requested data server FLASH file that can be streamed while portions of the request are being generated, the data server 202 can promptly respond to a request 222 from a client.

While only two placeholders are described, additional embodiments with a different number of placeholders are possible. In such additional embodiments, the number of fragments that may be generated can be a function of the number of placeholders. For instance, the number of fragments generated and stored may be equal to two times the number of placeholders plus one (e.g., number of fragments= (2*placeholders)+1)

For example, if four placeholders are provided for a data server FLASH file, then there may be nine fragments in total. In such a scenario with four placeholders, one may provide to the web address 226 and the other three may provide information regarding three distinct data requests.

Figure 3:
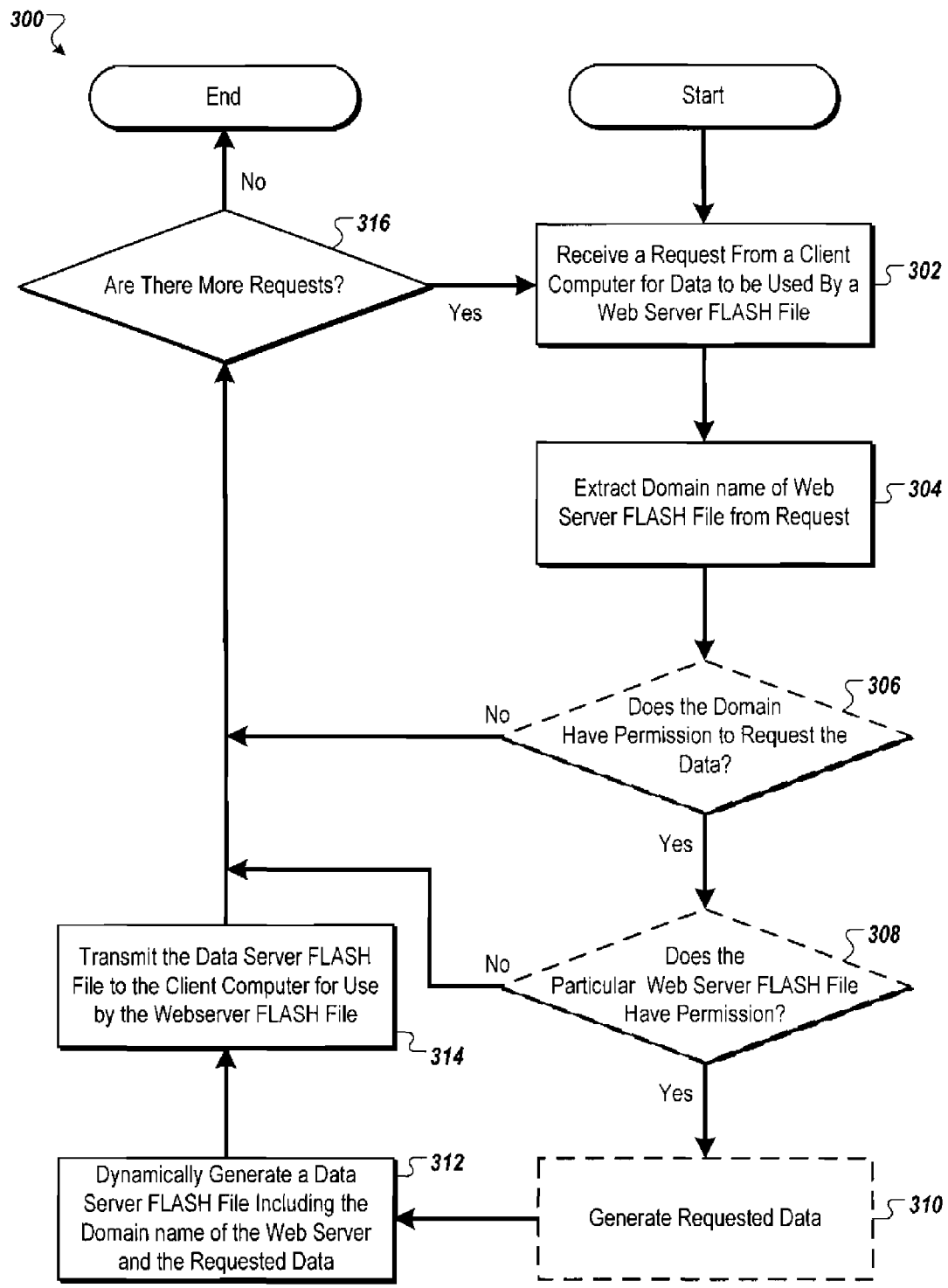
FIG. 3 is a flowchart of an example process for generating a data server FLASH file that provides cross-domain data services to a FLASH application.

FIG. 3 is a flowchart of an example process 300 for generating a data server FLASH file that provides cross-domain data services to a FLASH application. The processes 300 may be performed, for example, by a system such as the systems 100 and 200 and, for clarity of presentation, the description that follows uses the systems 100 and 200 as the basis of an example for describing the processes. However, another system, or combination of systems, may be used to perform the process 300.

At step 302, the process 300 can being by receiving a request from a client computer for data to be used by a web server FLASH file. For example, the data server 102 receives the request 118 from the client computer 104 for data to be used by the web server FLASH file 108 being executed using the FLASH application 114.

The process 300 can then extract a domain name of the web server FLASH file from the request at step 304. For instance, using domain of the web server 122, the data server 102 can extract the internet domain of the third-party web server 106 from which the web server FLASH file 108 originated from the request 118.

In some implementations, the process 300 can determine whether the extracted Internet domain has permission to receive the requested data at step 306. For example, the data server 202 can use the permission checker 209 to determine whether the request 222 has permission to receive the requested data based on the domain of the web server 226. If the Internet domain does not have permission, then process 300 can proceed to step 316 without processing the request. If the internet domain does have permission, then process 300 can continue to process the request at step 308, 310, and/or 312 (depending on the implementation).

In some implementations, the process 300 can determine whether the particular web server FLASH file has permission to receive the requested data at step 308. For example, the data server 202 can use the permission checker 209 to determine whether the request 222 has permission to receive the requested data based on the web server FLASH file from which the request 222 originated. If the internet domain does not have permission, then process 300 can proceed to step 316 without processing the request. If the internet domain does have permission, then process 300 can continue to process the request at step 310 and/or 312 (depending on the implementation).

In some implementations, the process 300 can generate the requested data at step 310. For example, the response data generator 206 can generate the response data 228 based upon the request 222. In some implementations, step 310 may not be performed if the requested data had already been generated (e.g., the requested data was previously generated for another request).

At step 312, the process 300 can dynamically generate a data server FLASH file including the domain name of the web server and the requested data. For example, the dynamic FLASH file generator 208 can generate the requested data server FLASH file using the precompiled fragments 218a, 218c, and 218e, and the placeholder fragments 218b and 218d replaced with the domain of the web server and the requested data, respectively.

In some implementations, dynamic generation of the data server FLASH file can include compiling an entire ACTIONSCRIPT with the domain of the web server and the requested data inserted. For example, the dynamic FLASH file generator 208 could insert the domain of the web server 226 and the requested response data 228 into the ACTIONSCRIPT template 213 at placeholders 214*a-b*. After making the insertion, the data server 202 could produce the data server FLASH file by compiling the ACTIONSCRIPT template 213 using the FLASH compiler 204.

At step 314, the process 300 can transmit the generated data server FLASH file to the client computer for use by the web server FLASH file. For example, the data server FLASH file 126 can be transmitted by the data server 102 to the client computer 104 for use by web server FLASH file 108 being executed by the FLASH application 114.

As described with reference to system 200, in some implementations the data server FLASH file can be provided to the client in a data stream such that a pre-compiled portion of the FLASH file is streamed while content is being generated in response to the request. For example, the precompiled fragment 236*a* can be streamed to the client while the response data generator 206 is generating the response data 228.

After transmitting the data server FLASH file, the process 300 can check whether there are additional requests to be processed at step 316. If there are additional request, the process 300 can return to step 302 for the additional request. If there are no more requests, then process 300 can end.

Figure 4A:
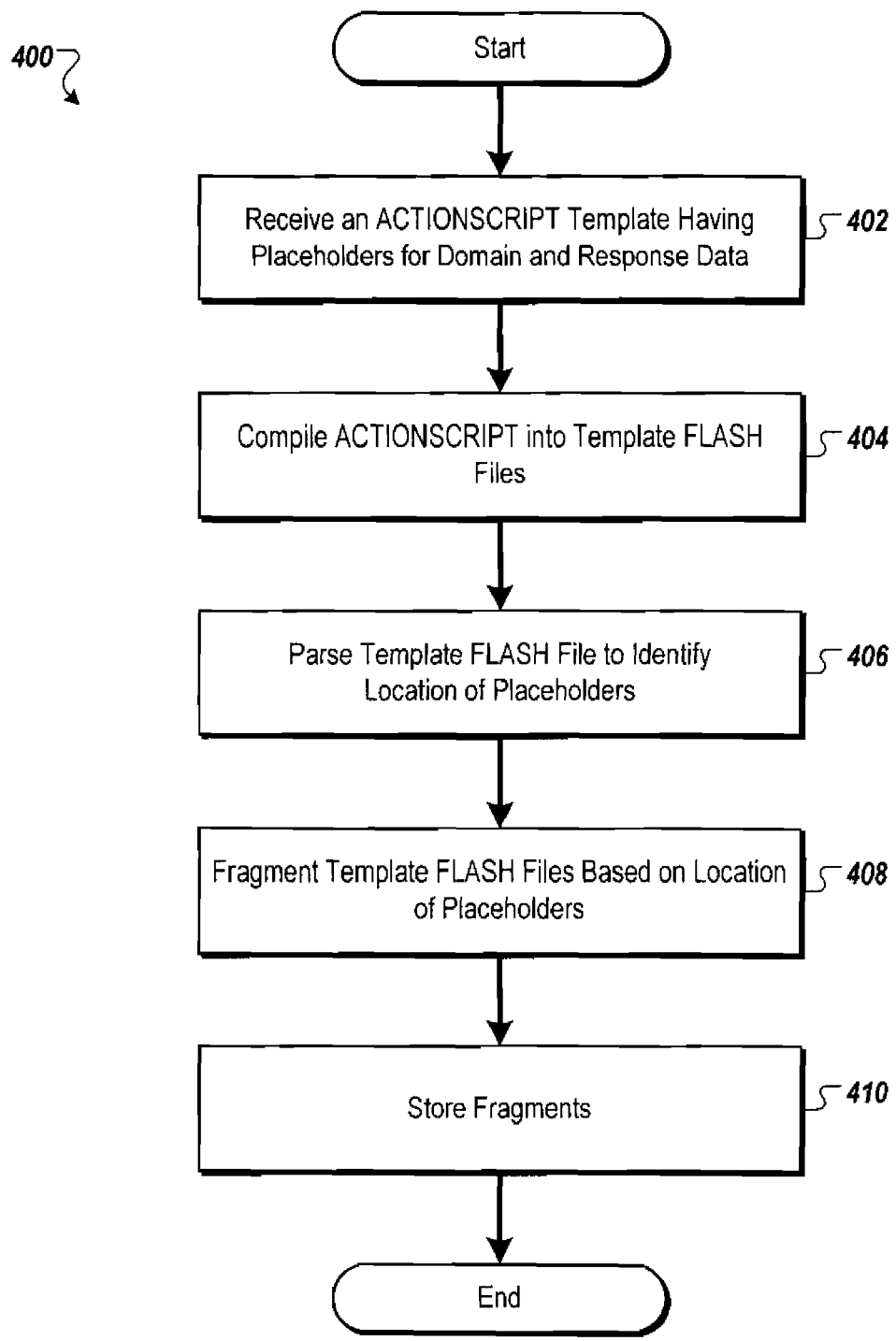
FIGS. 4A-B are flowcharts of example processes for compiling an ACTIONSCRIPT template with placeholders and using the compiled ACTIONSCRIPT template to generate a data server FLASH file that provides cross-domain data services to a FLASH application.
Figure 4B:
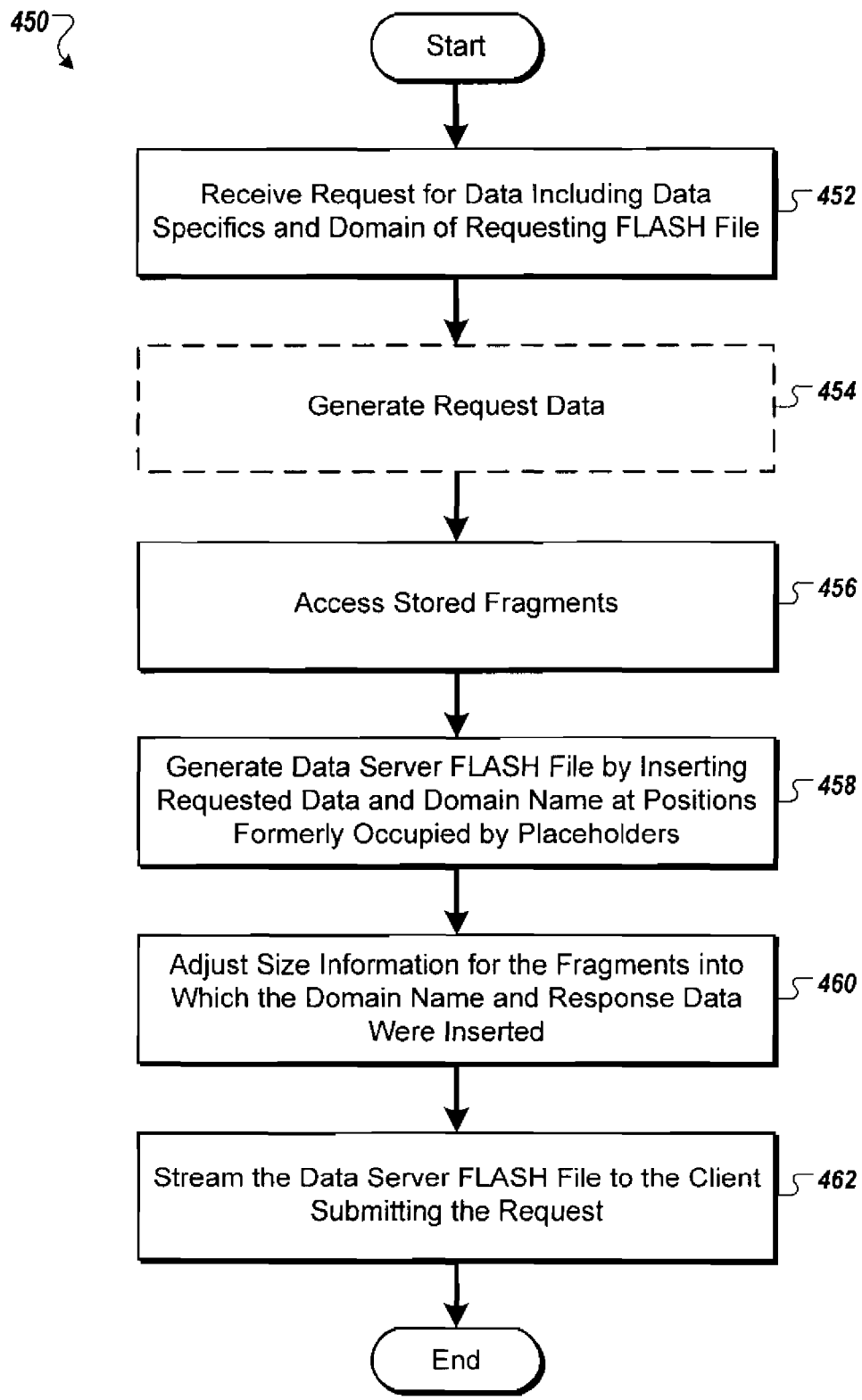

FIGS. 4A-B are flowcharts of example processes 400 and 450 for compiling an ACTIONSCRIPT template with placeholders and using the compiled ACTIONSCRIPT template to generate a data server FLASH file that provides cross-domain data services to a FLASH application. The processes 400 and 450 may be performed, for example, by a system such as the systems 100 and 200 and, for clarity of presentation, the description that follows uses the systems 100 and 200 as the basis of an example for describing the processes. However, another system, or combination of systems, may be used to perform the processes 400 and 450.

FIG. 4A is a flowchart of an example process 400 for compiling an ACTIONSCRIPT template with placeholders. Process 400 can begin at step 402 by receiving an ACTIONSCRIPT template having placeholders for an internet domain and response data. For example, the FLASH compiler 204 can receive the ACTIONSCRIPT 213 having placeholders 214*a-b* for response data and an Internet domain, respectively.

The process 400 can compile the received ACTIONSCRIPT into a template FLASH file (step 404). For example, the FLASH compiler 204 can compile the ACTIONSCRIPT template 213 into the compiled FLASH template 216.

The process 400 can then parse the template FLASH file to identify the location of the placeholders in the template FLASH file at step 406. Based upon this parsing, the process 400 can fragment the template FLASH file based on the location of the place holders at step 408. These fragments can then be stored 410. Process 400 ends after the fragments are stored.

For example, the data server 202 can parse and fragment the compiled FLASH template into fragments 218*a-e* based upon the placeholders. These fragments can then be stored in the compiled FLASH template data repository 212.

FIG. 4B is a flowchart of an example process 450 for using the compiled ACTIONSCRIPT template to generate a data server FLASH file that provides cross-domain data services to a FLASH application. Process 450 can begin at step 452 by receiving a request for a data server FLASH file, where the request can include data specifics and Internet domain of the requesting web server FLASH file. For example, the data server 202 can receive the request 222 containing data specifics 224 and the domain 226 of the web server for the requesting web server FLASH file.

In some implementations, the process 450 can generate the requested data at step 454. Step 454 may be similar to step 310 described above with reference to FIG. 3.

At step 456, process 450 can access compiled fragments for the requested data server FLASH file that are stored. For example, the dynamic FLASH file generator can obtain the pre-compiled fragments 230 that were previously generated and stored in the compiled FLASH template data repository 212. The compiled fragments being accessed could have been previously created in a manner similar to that described above with regard to process 400.

At step 456, the process 450 can generate a data server FLASH file by inserting the requested data and the domain name at positions formerly occupied by placeholders. Step 456 may be similar to step 312 described above with reference to FIG. 3.

At step 460, the process 450 can adjust size information for the fragments into which the domain name and the response data were inserted. Step 460 may also involve adjusting size information for the data server FLASH file that may be stored in non-placeholder fragments. Additionally, the step 460 may also include adjusting any internal references within the data server FLASH file that may be incorrect after the placeholder fragments were replaced.

For example, the FLASH file data size adjuster 232 can adjust the size of the data fragments 230 after the dynamic FLASH file generator has replaced the placeholders in the fragments 230.

At step 462, the process 450 can stream the data server FLASH file to the client that had submitted the request received at step 452. Streaming can be performed in a manner similar to step 314 describe above with regard to FIG. 3. Streaming can also be performed in a manner similar to that described with regard to the data stream 234 and the streamed fragments 236*a-e* depicted in FIG. 2. After step 462, the process 450 can end.

Figure 5:
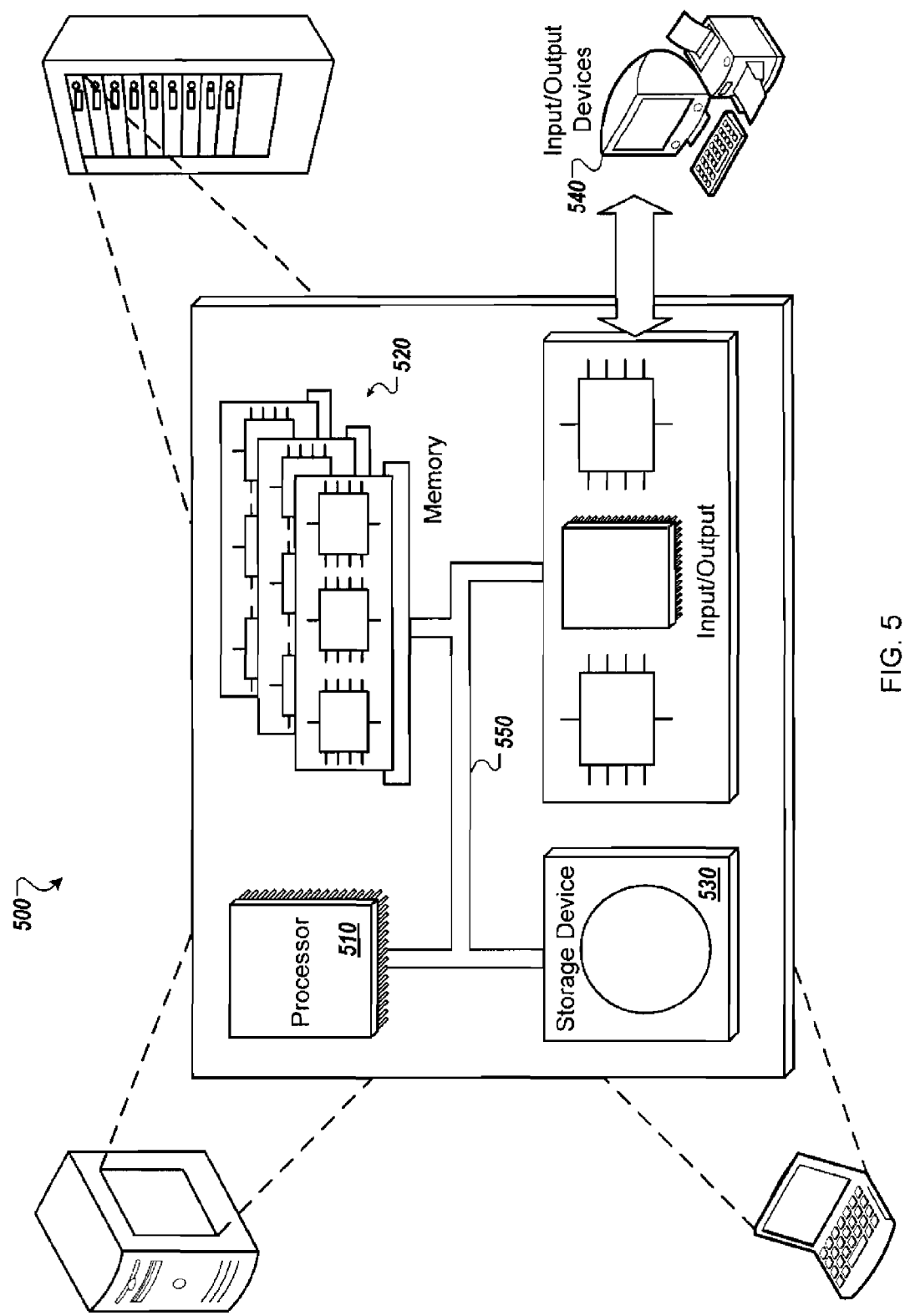
FIG. 5 is a schematic diagram of a computer system.

FIG. 5 is a schematic diagram of a computer system 500. The system 500 can be used for the operations described in association with any of the computer-implement methods described previously, according to one implementation. The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally the system can include portable storage media, such as, Universal Serial Bus (USB) FLASH drives. For example, the USB FLASH drives may store operating systems and other applications. The USB FLASH drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and FLASH memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. Moreover, other mechanisms for generating a data server FLASH file to enable cross-domain data service in a FLASH application may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, the method comprising:
    receiving at a data server computer hosted at a first internet domain a request from a client computer for data to be used by an application SWF file received from a web server hosted at a second internet domain and executed by the client computer, the request comprising the second internet domain and information specifying the requested data, wherein the application SWF file is a SWF formatted file;
    generating, in response to the received request, at least a portion of a data SWF file comprising the requested data and a domain identifier corresponding to the second internet domain, wherein the data SWF file is a SWF formatted file, the domain identifier configured to specify that SWF formatted files associated with the second internet domain are permitted to access the requested data within the data SWF file; and
    transmitting the data SWF file from the data server computer to the client computer, wherein the data SWF file is adapted to be accessed by the application SWF file to retrieve the requested data associated with the second internet domain.

2. The method of claim 1, further comprising compiling a template file into the data SWF file prior to receiving the request from a client computer for the data SWF file, wherein the template file is formatted in a scripting language that when compiled generates a SWF formatted file.

3. The method of claim 2, wherein compiling the template file into the data SWF file comprises compiling the template file to have a placeholder for the requested data and a placeholder for the domain identifier.

4. The method of claim 3, wherein generating at least a portion of the data SWF file comprises inserting into the data SWF file the requested data at the placeholder for the requested data and the domain identifier at the placeholder for the domain identifier.

5. The method of claim 3, further comprising fragmenting the data SWF file into five parts, wherein the five parts comprise a first part, a second part, a third part, a fourth part, and a fifth part, wherein the first part, the third part, and the fifth part correspond to non-placeholder parts of the data SWF file, and wherein the second part corresponds to the placeholder for the domain identifier and the fourth part corresponds to the placeholder for the requested data.

6. The method of claim 5, wherein generating at least a portion of the data SWF file comprises substituting the domain identifier for the second part and the requested data for the fourth part.

7. The method of claim 6, wherein generating at least a portion of the data SWF file further comprises adjusting a size of the second part to be a size of the domain identifier and adjusting a size of the fourth part to be a size of the requested data.

8. The method of claim 5, wherein transmitting the data SWF file comprises transmitting the five parts of the data SWF file one part at a time.

9. The method of claim 8, wherein transmitting the first part is performed concurrently with substituting the domain identifier for the second part.

10. The method of claim 1, wherein generating at least a portion of the data SWF file comprises compiling a template file with the requested data and the second internet domain into the data SWF file, wherein the template file is formatted in a scripting language that when compiled generates a SWF formatted file.

11. The method of claim 10, wherein transmitting the data SWF file comprises transmitting the data SWF file as a single part.

12. The method of claim 1, further comprising determining that the application SWF file is permitted to receive the requested data.

13. The method of claim 12, wherein determining that the application SWF file is permitted to receive the requested data comprises determining that the second internet domain is on a list of internet domains permitted to receive the requested data.

14. A system for transmitting a data vector graphic file to a client computer, the system comprising:
one or more servers, each comprising a processor and a memory, hosted at a first internet domain;
an interface to the one or more servers to receive a request from a client computer for data to be used by an application vector graphic file from a web server executed by the client computer, the web server hosted at a second internet domain, the request comprising the second internet domain and information specifying the requested data;
a means for generating, in response to the received request, at least a portion of a data vector graphic file comprising the requested data and a domain identifier corresponding to the second internet domain, the domain identifier specifying that application vector graphic files associated with the second internet domain are permitted to access the requested data contained within the data vector graphic file; and
a communication module to transmit the data vector graphic file from the one or more servers to the client computer, wherein the data vector graphic file is adapted to be accessed by the application vector graphic file to retrieve the requested data associated with the second internet domain.

15. The system of claim 14, further comprising:
a vector graphic compiler installed on the one or more servers to compile an vector graphic template into the data vector graphic file prior to receiving the request from a client computer for the data vector graphic file, wherein compiling the vector graphic template into the data vector graphic file comprises compiling the vector graphic template with a placeholder for the requested data and a placeholder for the domain identifier;
wherein generating at least a portion of the data vector graphic file comprises inserting into the data vector graphic file the requested data at the placeholder for the requested data and the domain identifier at the placeholder for the domain identifier.

16. The system of claim 15, further comprising:
a vector graphic file data size adjuster installed on the one or more servers to adjust a size of the data vector graphic file having the requested data inserted for the placeholder for the requested data and the domain identifier inserted for the placeholder for the domain identifier.

17. The system of claim 14, further comprising:
a response data generator installed on the one or more servers to generate the requested data in response to the request from the client computer.

18. A computer-implemented method, the method comprising:
compiling by a data server computer hosted at a first internet domain a template for a vector graphic file having a placeholder for an internet domain into a data vector graphic file;
executing by the data server computer the following operations when a request for the data vector graphic file is received from a client computer, wherein the request specifies at least a second internet domain of a third-party vector graphic file to access the data vector graphic file on the client computer:
substituting the second internet domain of the third-party vector graphic file for the placeholder for the internet domain in the data vector graphic file; and
sending to the client computer the data vector graphic file with the second internet domain of the third-party vector graphic file substituted, wherein the client computer authorizes access to the data vector graphic file by the third-party vector graphic file.

19. The method of claim 18, further comprising resizing the data vector graphic file to correspond to a size of the data vector graphic file with the second internet domain of the third-party vector graphic file substituted.

20. The method of claim 18, wherein the data vector graphic file is comprised of multiple parts and a first part of the multiple parts corresponds to the placeholder for the internet domain, wherein a second part of the multiple parts is sent to the client computer while the second internet domain of the third-party vector graphic file is being substituted into the first part.

* * * * *